(12) United States Patent
Fredricx et al.

(10) Patent No.: US 7,457,318 B2
(45) Date of Patent: Nov. 25, 2008

(54) SYSTEM COMPRISING A TERMINAL SYSTEM, AN ACCESS MULTIPLEXER AND A NETWORK

(75) Inventors: François Pierre Constant Fredricx, Ghent (BE); Tim Gyselings, Deurne (BE); Tim Vermeiren, Zele (BE); Hans Maurice Felix Corneel Dequeker, Herent (BE); Peter Vandaele, Gentbrugge (BE); Paul Cautereels, Hingene (BE); Patrick Albert Paul Renaux, Brussels (BE); Lajos Kiss, Wilrijk (BE)

(73) Assignee: ALCATEL, Paris (FR)

( * ) Notice: Subject to any disclaimer, the term of this patent is extended or adjusted under 35 U.S.C. 154(b) by 525 days.

(21) Appl. No.: 11/011,166

(22) Filed: Dec. 15, 2004

(65) Prior Publication Data

US 2005/0190793 A1    Sep. 1, 2005

(30) Foreign Application Priority Data

Dec. 16, 2003   (EP)   .................................. 03293174

(51) Int. Cl.
  *H04J 3/24*   (2006.01)
(52) U.S. Cl. ........................ 370/474; 370/390; 370/254
(58) Field of Classification Search ................ 370/250, 370/252, 412, 254, 392, 395, 218, 324, 251; 709/215, 229, 223, 240
See application file for complete search history.

(56) References Cited

U.S. PATENT DOCUMENTS 5,757,799 A * 5/1998 LaRue ........................ 370/423
5,774,660 A * 6/1998 Brendel et al. ............... 709/201
6,081,533 A * 6/2000 Laubach et al. ............. 370/421
6,282,193 B1 * 8/2001 Hluchyj et al. .............. 370/356
6,324,581 B1 * 11/2001 Xu et al. ...................... 709/229
6,438,100 B1 * 8/2002 Halpern et al. ............... 370/218
6,442,158 B1 * 8/2002 Beser .......................... 370/352
6,490,273 B1 * 12/2002 DeNap et al. ................ 370/352
6,526,056 B1    2/2003 Rekhter et al.
6,608,817 B1 * 8/2003 Ivory .......................... 370/250
6,771,662 B1 * 8/2004 Miki et al. ................... 370/469
6,895,429 B2 * 5/2005 Banga et al. ................. 709/215

(Continued)

FOREIGN PATENT DOCUMENTS

WO    WO 01/89154 A1    11/2001

(Continued)

*Primary Examiner*—Thong H Vu
(74) *Attorney, Agent, or Firm*—Sughrue Mion, PLLC

(57) ABSTRACT

Systems for transmitting information from terminal systems (1) via access multiplexers (3) comprising virtual forwarder systems (5) to networks are made less complex by inserting at the terminal systems (1) virtual forwarder internet protocol addresses (35,64,66) into destination fields of internet protocol headers for heading the information and by inserting destination internet protocol addresses (36,37,38,65,67) into routing fields of the internet protocol headers. Both the terminal systems (1) and the access multiplexers (3) should be made capable of dealing with internet protocol headers of the internet protocol version-4 or the internet protocol version-6 or higher, which comprise a destination field and a routing field. The destination internet protocol addresses (36,37,38, 65,67) in the routing fields allow distinguishment between different classes of services and/or applications used by the terminal system (1) simultaneously, without the access multiplexers (3) being obliged to unpack (parts of) the information and to detect (parts of) the information at higher layers.

10 Claims, 5 Drawing Sheets

U.S. PATENT DOCUMENTS

| | | | |
|---|---|---|---|
| 6,937,574 B1 * | 8/2005 | Delaney et al. | 370/254 |
| 6,959,002 B2 * | 10/2005 | Wynne et al. | 370/412 |
| 6,970,461 B2 * | 11/2005 | Unitt et al. | 370/390 |
| 6,985,956 B2 * | 1/2006 | Luke et al. | 709/229 |
| 7,136,377 B1 * | 11/2006 | Tweedly et al. | 370/356 |
| 7,219,158 B2 * | 5/2007 | Border et al. | 709/240 |
| 7,245,621 B2 * | 7/2007 | Sala et al. | 370/392 |
| 7,272,613 B2 * | 9/2007 | Sim et al. | 707/102 |
| 7,339,929 B2 * | 3/2008 | Zelig et al. | 370/390 |
| 2002/0067725 A1 * | 6/2002 | Oguchi et al. | 370/390 |
| 2002/0196802 A1 * | 12/2002 | Sakov et al. | 370/432 |
| 2003/0061321 A1 | 3/2003 | Roh | |
| 2003/0172145 A1 * | 9/2003 | Nguyen | 709/223 |
| 2004/0109418 A1 * | 6/2004 | Fedorkow et al. | 370/251 |
| 2004/0165581 A1 * | 8/2004 | Oogushi | 370/352 |
| 2004/0165600 A1 * | 8/2004 | Lee | 370/395.53 |
| 2004/0264481 A1 * | 12/2004 | Darling et al. | 370/401 |
| 2005/0063328 A1 * | 3/2005 | Dunagan et al. | 370/324 |
| 2006/0182117 A1 * | 8/2006 | Chen et al. | 370/395.5 |
| 2007/0025261 A1 * | 2/2007 | Ginsberg et al. | 370/250 |
| 2008/0002669 A1 * | 1/2008 | O'Brien et al. | 370/352 |

FOREIGN PATENT DOCUMENTS

| | | |
|---|---|---|
| WO | WO 03/075517 A2 | 9/2003 |

\* cited by examiner

SYSTEM COMPRISING A TERMINAL SYSTEM, AN ACCESS MULTIPLEXER AND A NETWORK

The invention relates to a system for transmitting information from a terminal system via an access multiplexer to a network coupled to the access multiplexer, which access multiplexer comprises a virtual forwarder system.

Examples of such terminal systems are (combinations of) personal computers (like laptops or desktops), modems (like digital-subscriber-line modems), and telecommunication terminal systems (like (screen) phones, wireless terminal systems or mobile terminal systems). Example of such access multiplexers are digital-subscriber-line access multiplexers.

A prior art system is of common general knowledge, and, although claimed to be ready for the internet protocol version-6, still being used in an internet protocol version-4 environment. The terminal system sends information like one or more packets, one or more messages or one or more packetised messages to the access multiplexer. A packet, message or packetised message comprises a header with a layer-2 destination address like a MAC (Medium Access Control) address. The access multiplexer comprises an Ethernet bridge for selecting a proper part of the virtual forwarder system in dependence of the layer-2 destination address. The selected proper part of the virtual forwarder system is for example coupled to a service provider and forwards the information to this service provider, to allow a user at the terminal system to visit a corporate intranet site and/or a public banking portal site.

The prior art system is disadvantageous, inter alia, due to being of a relatively high complexity: At the access multiplexer, incoming upstream information is supplied to the Ethernet bridge, which detects (parts of) the information, then the information is supplied to the virtual forwarder system, which detects (parts of) the information, before the information can be forwarded in an upstream direction. Incoming downstream information is supplied to the virtual forwarder system, which detects (parts of) the information, then the information is supplied to the Ethernet bridge, which detects (parts of) the information, before the information can be forwarded in a downstream direction. Further, to be able to perform extended routing control the access multiplexer must unpack the information to a large extent, which is also of a relatively high complexity.

It is an object of the invention, inter alia, to provide a system as defined in the preamble which is of a relatively low complexity.

The system according to the invention is characterised in that the access multiplexer further comprises a sender for sending a virtual forwarder internet protocol address defining at least a part of the virtual forwarder system to the terminal system; and in that the terminal system comprises a receiver for receiving the virtual forwarder internet protocol address; and an inserter for inserting the virtual forwarder internet protocol address into a destination field of an internet protocol header for heading the information and for inserting a destination internet protocol address into a routing field of the internet protocol header, which destination internet protocol address defines a destination in the network.

By introducing the sender in the access multiplexer and by introducing the receiver in the terminal system, the terminal system is informed of the virtual forwarder internet protocol address. The terminal system further receives the destination internet protocol address either from the sender in the access multiplexer, or for example through browsing. Through the inserter, the virtual forwarder internet protocol address is inserted into the destination field of the internet protocol header of the information and the destination internet protocol address is inserted into the routing field of the internet protocol header. Because of the presence of the virtual forwarder internet protocol address in the destination field of the internet protocol header, the terminal system can send its information directly to the proper part of the virtual forwarder system, without an Ethernet bridge being necessary. The destination internet protocol address in the routing field of the internet protocol header allows distinguishment between different classes of services used by the terminal system simultaneously, without the access multiplexer being obliged to unpack (parts of) the information and to detect (parts of) the information at higher layers (through unpacking). As a result, the system according to the invention is of a relatively low complexity.

It should be noted that, to function properly, both the terminal system and the access multiplexer should be made capable of dealing with internet protocol headers according to the internet protocol version-4 (in which case the routing field for example corresponds with a strict source routing option field or a loose source routing field), or with internet protocol headers of a higher level than the internet protocol version-4, like for example the internet protocol version-6 (in which case the routing field for example corresponds with a routing extension field).

An embodiment of the system according to the invention is characterised in that the information comprises first application information and second application information, with the destination internet protocol address comprising a first destination internet protocol address defining a first destination in the network and comprising a second destination internet protocol address defining a second destination in the network, and with the internet protocol header comprising a first internet protocol header for heading the first application information and comprising a second internet protocol header for heading the second application information, which first destination internet protocol address is to be inserted into the first internet protocol header and which second destination internet protocol address is to be inserted into the second internet protocol header.

In this case, the terminal system is contacting different applications. The first and second destination internet protocol addresses in the routing fields of the first and second internet protocol headers allow distinguishment between the different applications used by the terminal system simultaneously, without the access multiplexer being obliged to unpack the information and to detect the information at higher layers.

An embodiment of the system according to the invention is characterised in that the first destination comprises a first edge router and in that the second destination comprises a second edge router, with the virtual forwarder internet protocol address being inserted into the destination field of the first internet protocol header and into the destination field of the second internet protocol header.

In this case, different edge routers are used for the different applications, but theoretically only one virtual forwarder in the virtual forwarder system is required (due to only one virtual forwarder internet protocol address being used). In praxis, more than one virtual forwarder in the virtual forwarder system may still be used.

An embodiment of the system according to the invention is characterised in that the information further comprises third application information, which first application information and which third application information are destined for a first service provider and which second application information is destined for a second service provider, with the destination internet protocol address further comprising a third destination internet protocol address defining a third destination in the network, which third destination comprises a third edge router, and with the internet protocol header further comprising a third internet protocol header for heading the third application information, which third destination internet protocol address is to be inserted into the third internet protocol header, and with the virtual forwarder internet protocol address being inserted into the destination field of the third internet protocol header.

In this case, the terminal system contacts the first application via the first edge router and the third application via the third edge router, which first and third application are offered by the first (network) service provider, and the terminal system contacts the second application via the second edge router, which second application is offered by the second (network) service provider. Again, different edge routers are used for the different applications, but theoretically only one virtual forwarder in the virtual forwarder system is required. In praxis, more than one virtual forwarder in the virtual forwarder system may still be used.

An embodiment of the system according to the invention is characterised in that the virtual forwarder system comprises a first virtual forwarder and a second virtual forwarder, with the virtual forwarder internet protocol address comprising a first virtual forwarder internet protocol address defining the first virtual forwarder and comprising a second virtual forwarder internet protocol address defining the second virtual forwarder, which first virtual forwarder internet protocol address is to be inserted into the destination field of the first internet protocol header and which second virtual forwarder internet protocol address is to be inserted into the destination field of the second internet protocol header, and with the first destination comprising a first application at a first service provider and with the second destination comprising a second application at a second service provider.

In this case, the first and second destination internet protocol addresses in the routing fields of the first and second internet protocol headers define the different applications in/behind the edge routers. Therefore, different virtual forwarders in the virtual forwarder system have been introduced, and different virtual forwarder internet protocol addresses must be sent to the terminal system and must be inserted by the terminal system into the destination fields of the different internet protocol headers.

In the prior art, a terminal system that has different applications running from different service providers needs to receive distinct internet protocol addresses, one per provider. During a configuration of the terminal system, it also receives the corresponding internet protocol addresses of the corresponding virtual forwarders of the access multiplexer. The terminal system then deduces the corresponding Ethernet addresses via signalling messages. The information is then sent to the appropriate virtual forwarder by means of its Ethernet address. According to the invention, the terminal system needs only to receive a single internet protocol address for all service providers, and after reception of the internet protocol addresses of the different virtual forwarders of the access multiplexer, the application can select which service provider (and hence which virtual forwarder) to send the information to by using the corresponding virtual forwarder internet protocol address in the information header (i.e. putting the virtual forwarder internet protocol address in the destination field and putting the destination internet protocol address in the routing field). As a side benefit this also eliminates the need for an Ethernet switch in front of the virtual forwarders in the access multiplexer. This way of selecting the service provider on basis of layer-3 internet protocol addresses is more straightforward and obvious for the terminal system than selecting on basis of layer-2 Ethernet addresses. The single internet protocol address can now be assigned to the terminal system by the access provider instead of one of the service providers. The address could be based on e.g. geographical location. This offers a competitive advantage to access providers; they can manage their own internet protocol addressing realm for their subscribers and this in an effective way, allowing the access provider to offer services on its own servers, while still being able to provide simultaneous connections to different service providers.

The invention also relates to an access multiplexer for use in a system for transmitting information from a terminal system via the access multiplexer to a network coupled to the access multiplexer, which access multiplexer comprises a virtual forwarder system.

The access multiplexer according to the invention is characterised in that the access multiplexer further comprises
a sender for sending a virtual forwarder internet protocol address defining at least a part of the virtual forwarder system to the terminal system.

The invention also relates to an access multiplexer processor program product for use in a system for transmitting information from a terminal system via an access multiplexer to a network coupled to the access multiplexer, which access multiplexer comprises a virtual forwarder system.

The access multiplexer processor program product according to the invention is characterised in that the access multiplexer processor program product comprises
a sending function for sending a virtual forwarder internet protocol address defining at least a part of the virtual forwarder system to the terminal system.

The invention also relates to a terminal system for use in a system for transmitting information from the terminal system via an access multiplexer to a network coupled to the access multiplexer, which access multiplexer comprises a virtual forwarder system.

The terminal system according to the invention is characterised in that the terminal system comprises
a receiver for receiving a virtual forwarder internet protocol address defining at least a part of the virtual forwarder system; and
an inserter for inserting the virtual forwarder internet protocol address into a destination field of an internet protocol header for heading the information and for inserting a destination internet protocol address into a routing field of the internet protocol header, which destination internet protocol address defines a destination in the network.

The invention also relates to a terminal system processor program product for use in a system for transmitting information from a terminal system via an access multiplexer to a network coupled to the access multiplexer, which access multiplexer comprises a virtual forwarder system.

The terminal system processor program product according to the invention is characterised in that the terminal system processor program product comprises
a receiving function for receiving a virtual forwarder internet protocol address defining at least a part of the virtual forwarder system; and
an inserting function for inserting the virtual forwarder internet protocol address into a destination field of an internet protocol header for heading the information and for inserting a destination internet protocol address into a routing field of the internet protocol header, which destination internet protocol address defines a destination in the network.

The invention also relates to a method for transmitting information from a terminal system via an access multiplexer to a network coupled to the access multiplexer, which access multiplexer comprises a virtual forwarder system.

The method according to the invention is characterised in that the method comprises the steps of
sending, from the access multiplexer to the terminal system, a virtual forwarder internet protocol address defining at least a part of the virtual forwarder system;
receiving, at the terminal system, the virtual forwarder internet protocol address; and
inserting, at the terminal system, the virtual forwarder internet protocol address into a destination field of an internet protocol header for heading the information and inserting a destination internet protocol address into a routing field of the internet protocol header, which destination internet protocol address defines a destination in the network.

Embodiments of the access multiplexer according to the invention and of the access multiplexer processor program product according to the invention and of the terminal system according to the invention and of the terminal system processor program product and of the method according to the invention correspond with the embodiments of the system according to the invention.

The invention is based upon an insight, inter alia, that internet protocol headers according to the internet protocol version-4 comprise a destination field and comprise a strict source routing option field or a loose source routing field and that internet protocol headers of a higher level than the internet protocol version-4, like for example the internet protocol version-6, comprise a destination field and comprise a routing extension field, and is based upon a basic idea, inter alia, that the virtual forwarder internet protocol address is to be inserted into the destination field of the internet protocol header and the destination internet protocol address is to be inserted into the routing field of the internet protocol header.

The invention solves the problem, inter alia, to provide a system which is of a relatively low complexity, and is further advantageous, inter alia, in that the destination internet protocol address in the routing field of the internet protocol header allows distinguishment between different classes of services used by the terminal system simultaneously, without the access multiplexer being obliged to unpack (parts of) the information and to detect (parts of) the information at higher layers.

These and other aspects of the invention will be apparent from and elucidated with reference to the embodiments(s) described hereinafter.

Figure 1:
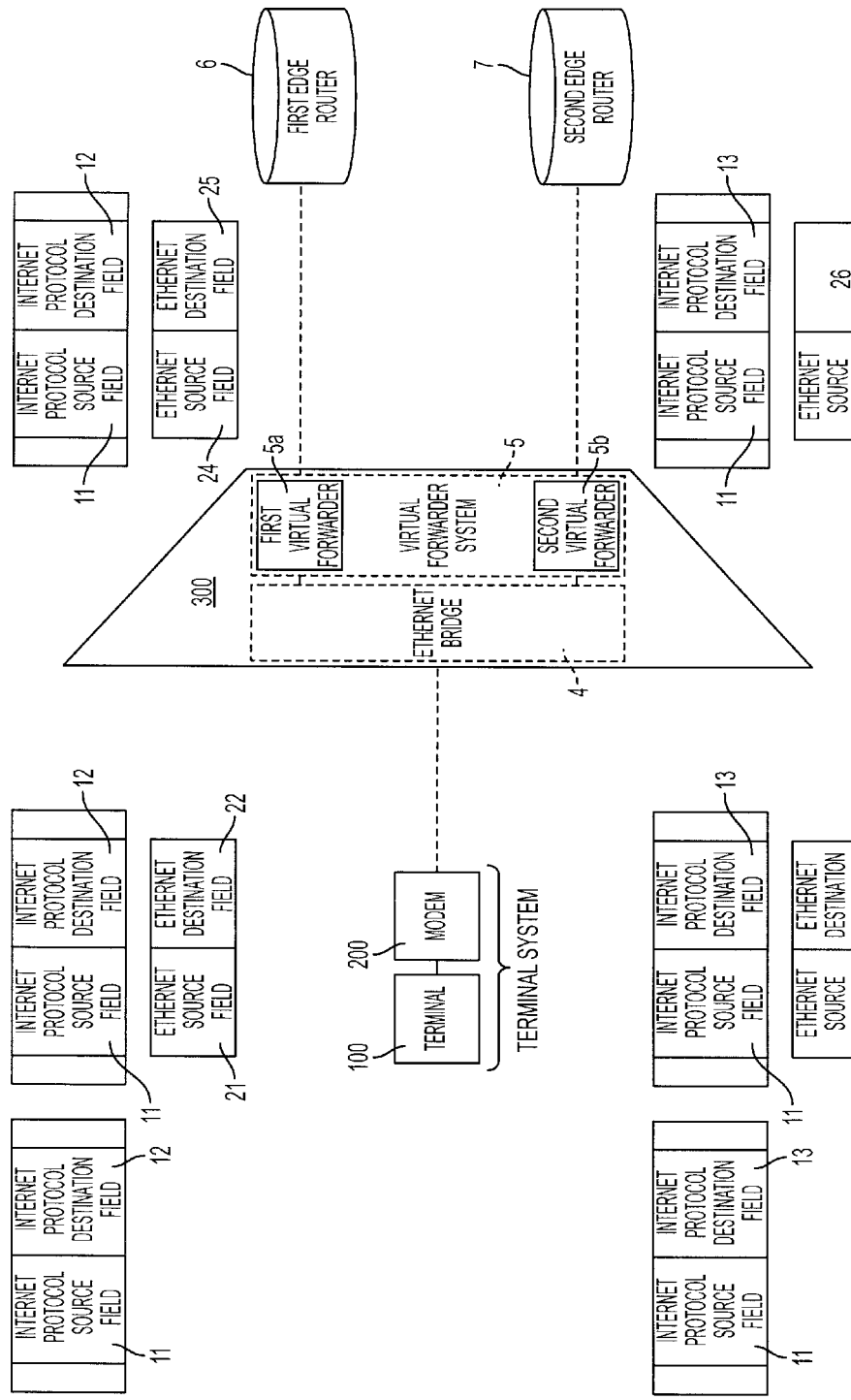
FIG. 1 shows in block diagram form a prior art system comprising a prior art access multiplexer and a prior art terminal system.

The block diagram of the prior art system as shown in FIG. 1 comprises a prior art terminal system 100,200 comprising for example a terminal 100 and a modem 200 coupled to a prior art access multiplexer 300. The access multiplexer 300 comprises an Ethernet bridge 4 and a virtual forwarder system 5 comprising a first virtual forwarder 5a coupled to a first edge router 6 and a second virtual forwarder 5b coupled to a second edge router 7.

The terminal system 100,200 sends information to a network comprising the edge routers 6,7. This information for example comprises one or more packets, one or more messages, or one or more packetised messages, each headed by a header. In case of the terminal system 100,200 visiting two different destinations simultaneously, the information is to be divided into first application information (destined for a first destination) and second application information (destined for a second destination). For the first application information, the header comprises at layer-2 an Ethernet source field 21 and an Ethernet destination field 22, and comprises at layer-3 an internet protocol source field 11 and an internet protocol destination field 12. For the second application information, the header comprises at layer-2 an Ethernet source field 21 and an Ethernet destination field 23, and comprises at layer-3 an internet protocol source field 11 and an internet protocol destination field 13.

The first application information arrives at the Ethernet bridge 4 and is then supplied to the first virtual forwarder 5a and converted such that, between the access multiplexer 300 and the first edge router 6, the header still comprises at layer-3 an internet protocol source field 11 and an internet protocol destination field 12, but comprises at layer-2 an Ethernet source field 24 and an Ethernet destination field 25. The second application information arrives at the Ethernet bridge 4 and is then supplied to the second virtual forwarder 5b and converted such that, between the access multiplexer 300 and the second edge router 7, the header still comprises at layer-3 an internet protocol source field 11 and an internet protocol destination field 13, but comprises at layer-2 an Ethernet source field 24 and an Ethernet destination field 26. Summarising, at layer-3, the fields are filled in as follows: 11=address A, 12=address X and 13=address Y, and at layer-2, 21=address A, 22=address VF1, 23=address VF2, 24=address AM, 25=address ER1 and 26=address ER2. Thereby, A indicates terminal system 100,200, X indicates the first destination, Y indicates the second destination, VF1 indicates the first virtual forwarder 5a, VF2 indicates the second virtual forwarder 5b, AM indicates the access multiplexer 300, ER1 indicates the first edge router 6, and ER2 indicates the second edge router 7.

Figure 2:
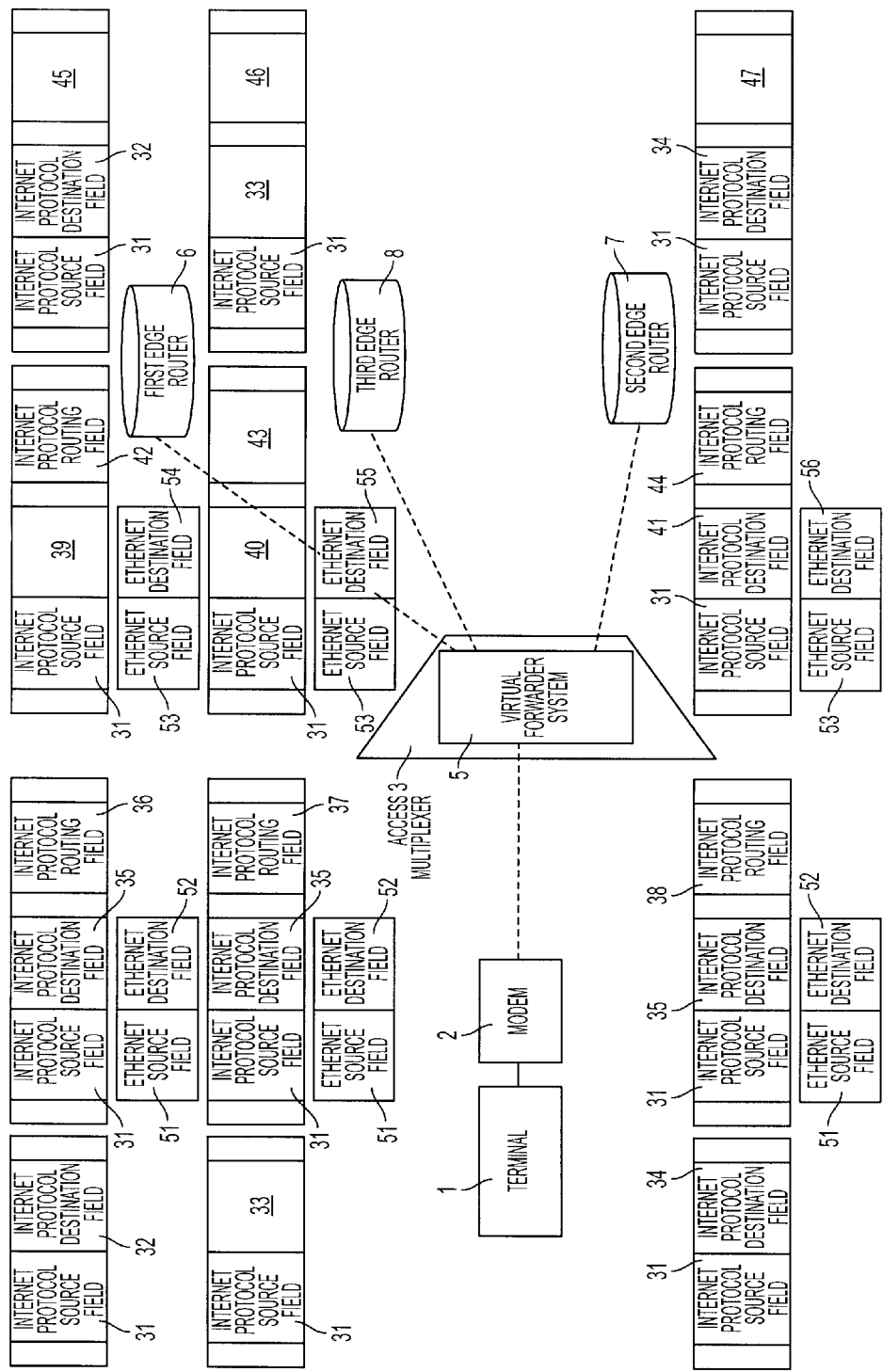
FIG. 2 shows in block diagram form a system according to the invention comprising an access multiplexer according to the invention and a terminal system according to the invention.
Figure 3:
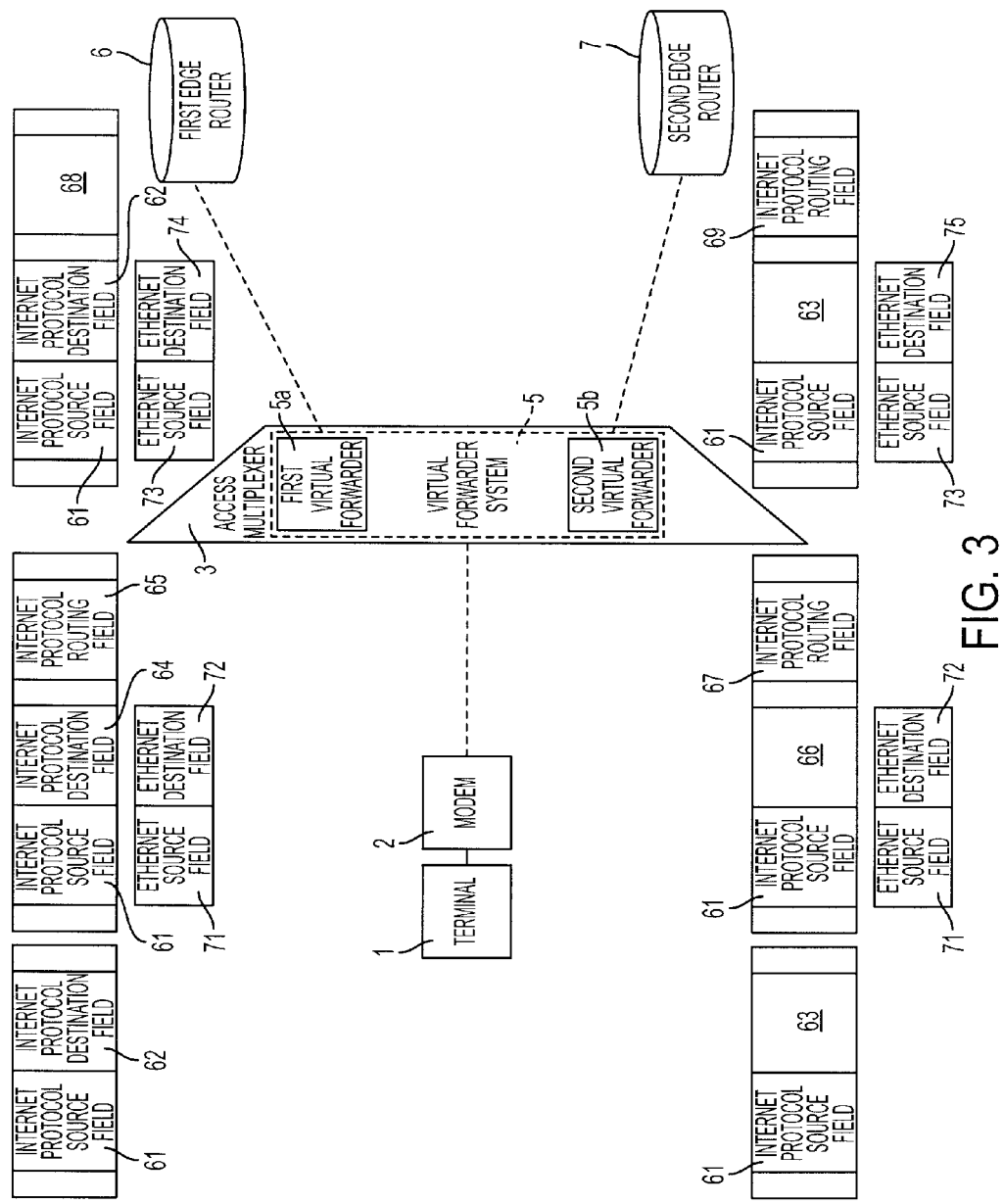
FIG. 3 shows in block diagram form a system according to the invention comprising an access multiplexer according to the invention and a terminal system according to the invention.

To be able to avoid the Ethernet bridge 4 and to reduce the complexity of the system, according to the invention, at layer-3, things are changed as follows as shown in FIGS. 2 and 3.

The block diagram of the system according to the invention as shown in FIG. 2 comprises a terminal system 1,2 according to the invention comprising for example a terminal 1 and/or a modem 2 coupled to an access multiplexer 3 according to the invention. The access multiplexer 3 no longer comprises any Ethernet bridge, but comprises a virtual forwarder system 5 comprising one or more virtual forwarder not shown and coupled to the first edge router 6 and to the second edge router 7 and to a third edge router 8.

The terminal system 1,2 sends information to a network comprising the edge routers 6,7,8. This information for example comprises one or more packets, one or more messages, or one or more packetised messages, each headed by a header. In case of the terminal system 1,2 visiting three different destinations simultaneously, the information is to be divided into first application information (destined for a first destination comprising the first edge router 6) and second application information (destined for a second destination comprising the second edge router 7) and third application information (destined for a third destination comprising the third edge router 8). The first application information and the third application information are supplied to a first service provider using the first edge router 6 and the third edge router 8. The second application information is supplied to a second service provider using the second edge router 7.

For the first application information, the header comprises at layer-2 an Ethernet source field 51 and an Ethernet destination field 52, and comprises at layer-3 an internet protocol source field 31 and an internet protocol destination field 35 and an internet protocol routing field 36. Originally, at layer-3, the header comprises an internet protocol source field 31 and an internet protocol destination field 32, whereby the terminal system 1,2 inserts the content for the internet protocol destination field 35 and the content for the internet protocol routing field 36 as described in detail for FIGS. 4 and 5. For the second application information, the header comprises at layer-2 an Ethernet source field 51 and an Ethernet destination field 52, and comprises at layer-3 an internet protocol source field 31 and an internet protocol destination field 35 and an internet protocol routing field 38. Originally, at layer-3, the header comprises an internet protocol source field 31 and an internet protocol destination field 34, whereby the terminal system 1,2 inserts the content for the internet protocol destination field 35 and the content for the internet protocol routing field 38 as described in detail for FIGS. 4 and 5. For the third application information, the header comprises at layer-2 an Ethernet source field 51 and an Ethernet destination field 52, and comprises at layer-3 an internet protocol source field 31 and an internet protocol destination field 35 and an internet protocol routing field 37. Originally, at layer-3, the header comprises an internet protocol source field 31 and an internet protocol destination field 33, whereby the terminal system 1,2 inserts the content for the internet protocol destination field 35 and the content for the internet protocol routing field 37 as described in detail for FIGS. 4 and 5.

The first application information arrives at the access multiplexer 3 and is then supplied to the virtual forwarder system 5 and converted such that, between the access multiplexer 3 and the first edge router 6, the header comprises at layer-2 an Ethernet source field 53 and an Ethernet destination field 54 and comprises at layer-3 an internet protocol source field 31 and an internet protocol destination field 39 and an internet protocol routing field 42. At the other side of the first edge router 6, the header comprises at layer-3 an internet protocol source field 31 and an internet protocol destination field 32 and an internet protocol routing field 45. The second application information arrives at the access multiplexer 3 and is then supplied to the virtual forwarder system 5 and converted such that, between the access multiplexer 3 and the second edge router 7, the header comprises at layer-2 an Ethernet source field 53 and an Ethernet destination field 56 and comprises at layer-3 an internet protocol source field 31 and an internet protocol destination field 41 and an internet protocol routing field 44. At the other side of the second edge router 7, the header comprises at layer-3 an internet protocol source field 31 and an internet protocol destination field 34 and an internet protocol routing field 47. The third application information arrives at the access multiplexer 3 and is then supplied to the virtual forwarder system 5 and converted such that, between the access multiplexer 3 and the third edge router 8, the header comprises at layer-2 an Ethernet source field 53 and an Ethernet destination field 55 and comprises at layer-3 an internet protocol source field 31 and an internet protocol destination field 40 and an internet protocol routing field 43. At the other side of the third edge router 8, the header comprises at layer-3 an internet protocol source field 31 and an internet protocol destination field 33 and an internet protocol routing field 46.

At layer-3, the fields are filled in as follows: 31=address A, 32=address X, 33=address Y, 34=address Z, 35=address VF, 36=address ER1 and address X, 37=address ER3 and address Y, 38=address ER2 and address Z, 39=address ER1, 40=address ER3, 41=address ER2, 42=address VF and address x, 43=address VF and address y, 44=address VF and address z, 45=address VF and address ER1, 46=address VF and address ER3, 47=address VF and address ER2, and at layer-2, 51=address A, 52=a default address, 53=address AM, 54=address ER1, 55=address ER3 and 56=address ER2. Thereby, A indicates terminal system 1,2, X indicates the first destination, Y indicates the second destination, Z indicates the third destination, VF indicates the virtual forwarder system 5, AM indicates the access multiplexer 3, ER1 indicates the first edge router 6, ER2 indicates the second edge router 7, and ER3 indicates the third edge router 8.

In FIG. 2, the access multiplexer 3 sends the virtual forwarder internet protocol address VF to be filled in into the fields 35 and defining at least a part of the virtual forwarder system 5 to the terminal system 1,2 and sends the destination internet protocol addresses ER1,ER2,ER3 to be inserted into the fields 36,37,38 and defining destinations in the network. The terminal system 1,2 receives these addresses from the access multiplexer 3, and further receives, for example through browsing, the destination internet protocol addresses X,Y,Z to be inserted into the fields 36,37,38 and defining destinations in the network.

The block diagram of the system according to the invention as shown in FIG. 3 comprises a terminal system 1,2 according to the invention comprising for example a terminal 1 and a modem 2 coupled to an access multiplexer 3 according to the invention. The access multiplexer 3 no longer comprises any Ethernet bridge, but comprises a virtual forwarder system 5 comprising a first virtual forwarder 5a coupled to the first edge router 6 and a second virtual forwarder 5b coupled to the second edge router 7.

The terminal system 1,2 sends information to a network comprising the edge routers 6,7. This information for example comprises one or more packets, one or more messages, or one or more packetised messages, each headed by a header. In case of the terminal system 1,2 visiting two different destinations simultaneously, the information is to be divided into first application information (destined for a first destination at/via the first edge router 6) and second application information (destined for a second destination at/via the second edge router 7). The first application information is supplied to a first service provider using the first edge router 6. The second application information is supplied to a second service provider using the second edge router 7.

For the first application information, the header comprises at layer-2 an Ethernet source field 71 and an Ethernet destination field 72, and comprises at layer-3 an internet protocol source field 61 and an internet protocol destination field 64 and an internet protocol routing field 65. Originally, at layer-3, the header comprises an internet protocol source field 61 and an internet protocol destination field 62, whereby the terminal system 1 inserts the content for the internet protocol destination field 64 and the content for the internet protocol routing field 65 as described in detail for FIGS. 4 and 5. For the second application information, the header comprises at layer-2 an Ethernet source field 71 and an Ethernet destination field 72, and comprises at layer-3 an internet protocol source field 61 and an internet protocol destination field 66 and an internet protocol routing field 67. Originally, at layer-3, the header comprises an internet protocol source field 61 and an internet protocol destination field 63, whereby the terminal system 1,2 inserts the content for the internet protocol destination field 66 and the content for the internet protocol routing field 67 as described in detail for FIGS. 4 and 5.

The first application information arrives at the access multiplexer 3 and is then supplied to the first virtual forwarder 5a and converted such that, between the access multiplexer 3 and the first edge router 6, the header comprises at layer-2 an Ethernet source field 73 and an Ethernet destination field 74 and comprises at layer-3 an internet protocol source field 61 and an internet protocol destination field 62 and an internet protocol routing field 68. The second application information arrives at the access multiplexer 3 and is then supplied to the second virtual forwarder 5b and converted such that, between the access multiplexer 3 and the second edge router 7, the header comprises at layer-2 an Ethernet source field 73 and an Ethernet destination field 75 and comprises at layer-3 an internet protocol source field 61 and an internet protocol destination field 63 and an internet protocol routing field 69.

At layer-3, the fields are filled in as follows: 61=address A, 62=address X, 63=address Y, 64=address VF1, 65=address X, 66=address VF2, 67=address Y, 68=address VF1 and 69=address VF2, and at layer-2, 71=address A, 72=a default address, 73=address AM, 74=address ER1 and 75=address ER2. Thereby, A indicates terminal system 1, X indicates the first destination, Y indicates the second destination, VF1 indicates the first virtual forwarder 5a, VF2 indicates the second virtual forwarder 5b, AM indicates the access multiplexer 3, ER1 indicates the first edge router 6 and ER2 indicates the second edge router 7.

In FIG. 3, the access multiplexer 3 sends the virtual forwarder internet protocol addresses VF1,VF2 to be filled in into the fields 64,66 and defining at least a part of the virtual forwarder system 5 to the terminal system 1,2. The terminal system 1,2 receives these addresses from the access multiplexer 3, and further receives, for example through browsing, the destination internet protocol addresses X,Y to be inserted into the fields 65,67 and defining destinations in the network.

Figure 4:
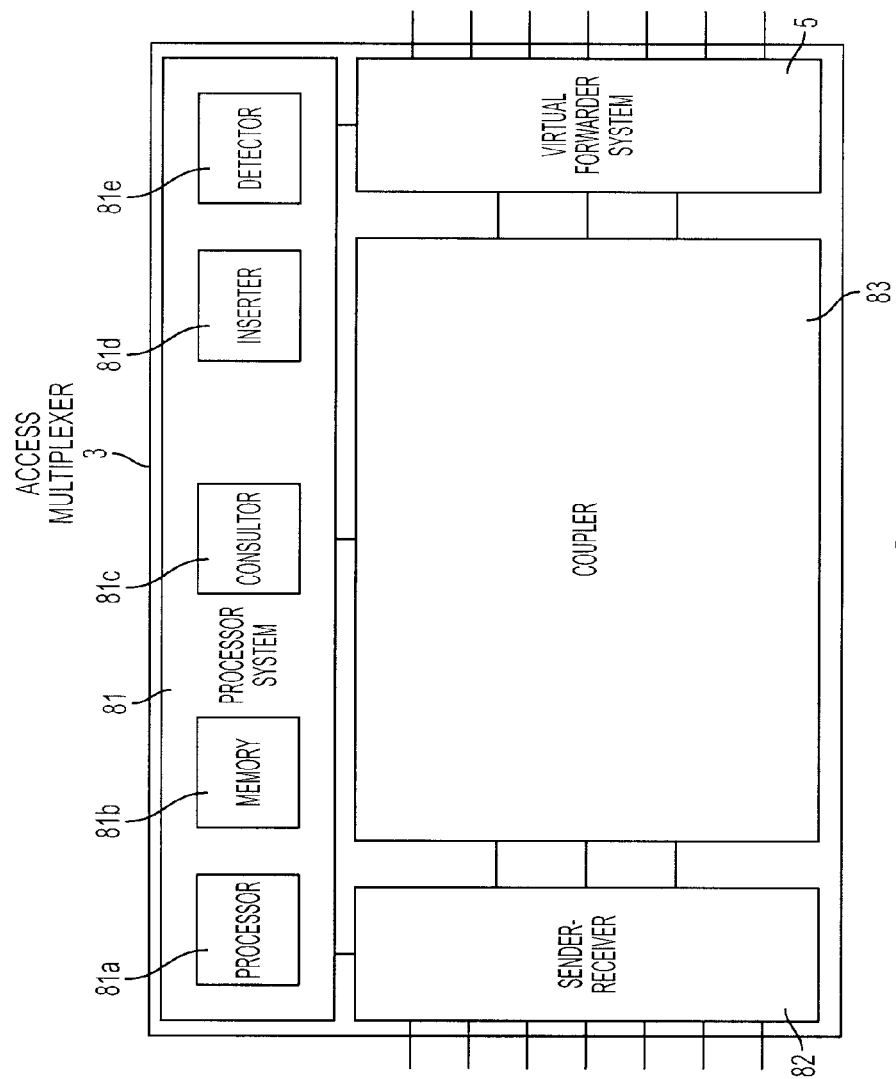
FIG. 4 shows in block diagram form an access multiplexer according to the invention.

The block diagram of the access multiplexer 3 according to the invention as shown in FIG. 4 comprises a processor system 81 coupled to a sender-receiver 82, to a coupler 83 and to a virtual forwarder system 5. The sender-receiver 82 is internally coupled via the coupler 83 to the virtual forwarder system 5 and is externally coupled to the terminal system 1,2. The virtual forwarder system 5 is externally coupled to the edge routers 6,7(,8). The processor system 81 comprises for example a processor 81a, a memory 81b, a consultor 81c, an inserter 81d and a detector 81e.

Figure 5:
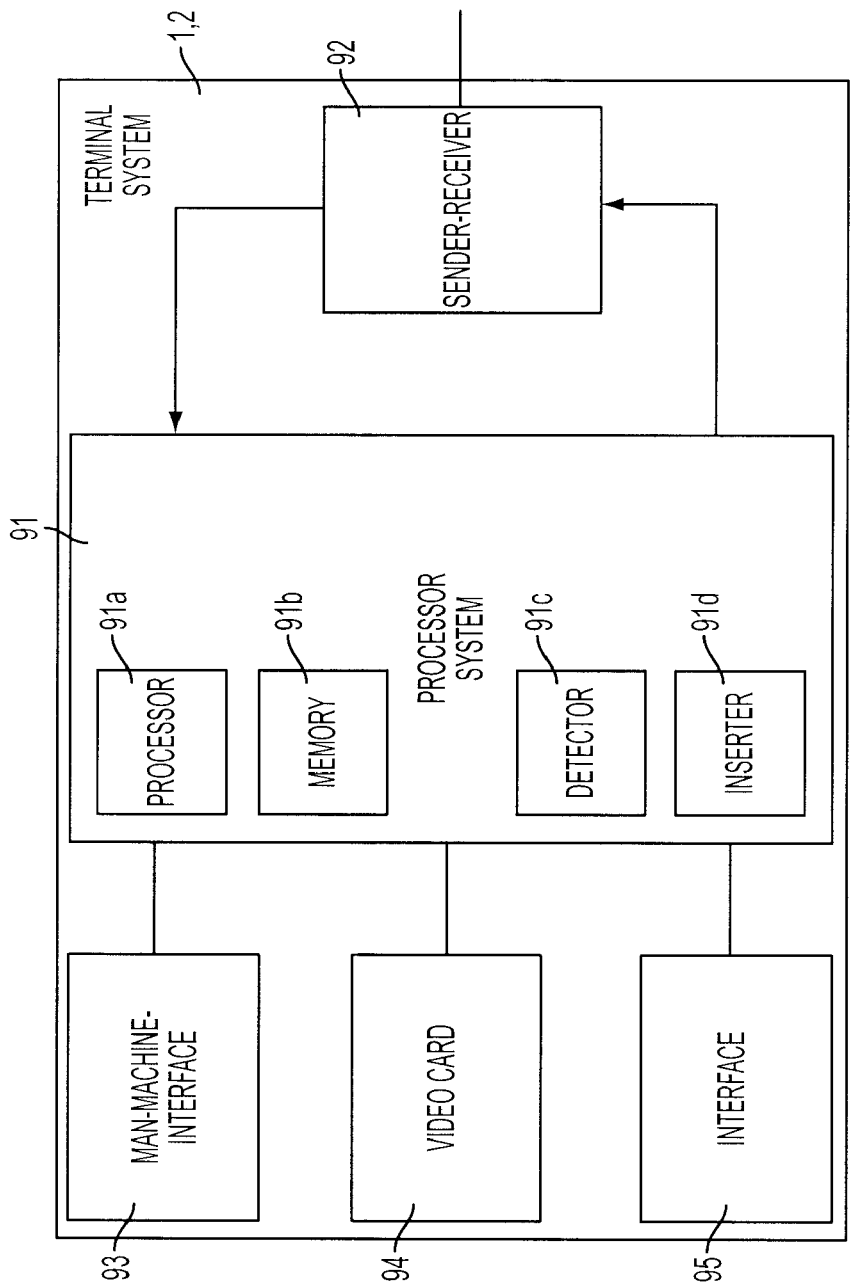
FIG. 5 shows in block diagram form a terminal system according to the invention.

The block diagram of a terminal system 1,2 according to the invention as shown in FIG. 5 comprises a sender-receiver 92 externally coupled to the access multiplexer 3 and internally coupled to a processor system 91, which is further coupled to a man-machine-interface 93, a video card 94 and an interface 95 (like for example a memory interface for interfacing additional memories for example in case of the terminal system 1,2 corresponding with a terminal 1, or like for example a network/coupling interface for interfacing a further network/coupling interface or a processor system interface for interfacing a further processor system both for example in case of the terminal system 1,2 corresponding with a modem 2). The processor system 91 comprises for example a processor 91a, a memory 91b, a detector 91c and an inserter 91d.

In case of a user at the terminal system 1,2 wishing to visit a corporate intranet site (first application) and a public banking portal site (second application) simultaneously, the terminal system 1,2 sends signalling info (initialisation info) common in the art to the access multiplexer 3. The detector 81e detects this signalling info and instructs the consultor 81c to retrieve a virtual forwarder internet protocol address VF,VF1,VF2 defining at least a part of the virtual forwarder system 5 and to retrieve a destination internet protocol address ER1,ER2,ER3 defining a destination in the network. This retrieving is done common in the art and for example at an authentication server not shown and coupled to the access multiplexer 3. The virtual forwarder internet protocol address VF,VF1,VF2 and the destination internet protocol address ER1,ER2,ER3 are sent to the terminal system 1,2. For example through browsing, the terminal system 1,2 further receives the destination internet protocol addresses X,Y,Z. The inserter 91d inserts the virtual forwarder internet protocol address VF,VF1,VF2 into a destination field of an internet protocol header and inserts the destination internet protocol address ER1,ER2,ER3,X,Y,Z into a routing field of the internet protocol header. This internet protocol header is arranged for heading the information to be sent from the terminal system 1,2 to the network for making the visiting of the sites possible. In the access multiplexer 3, the detector 81e detects (parts of) the header and instructs the inserter 81d to insert for example the contents common in the art for the fields 39,40, 41,42,43,44,53,54,55,56 and 62,63,68,69,73,74,75 as described for FIGS. 2 and 3 etc.

Because of the presence of the virtual forwarder internet protocol address in the destination field of the internet protocol header, the terminal system 1 can send its information directly to the proper part of the virtual forwarder system 5, without an Ethernet bridge 4 being any longer necessary. The destination internet protocol address in the routing field of the internet protocol header allows distinguishment between different classes of services and/or between different applications used by the terminal system 1,2 simultaneously, without the access multiplexer 3 being obliged to unpack (parts of) the information and to detect (parts of) the information at higher layers. As a result, the system according to the invention is of a relatively low complexity. To function properly, both the terminal system 1,2 and the access multiplexer 3 should be made capable of dealing with internet protocol headers according to the internet protocol version-4 (in which case the routing field for example corresponds with a strict source routing option field or a loose source routing field), or with internet protocol headers of a higher level than the internet protocol version-4, like for example the internet protocol version-6 (in which case the routing field for example corresponds with a routing extension field).

Any destination may comprise a final destination and/or may comprise an intermediate destination. Any terminal system 1,2 may be a final subscriber unit like a personal computer (a laptop or a desktop etc.) or a telecommunication terminal system (a (screen) phone, a wireless terminal system or a mobile terminal system etc.) or may be an intermediate subscriber unit (like a modem etc.) or may be a combination thereof. The access multiplexer 3 may be a digital-subscriber-line access multiplexer or may be an other network-unit etc.

In the processor systems 81,91, the modules 81a-e,91a-d may be hardware, software or a mixture of both, whereby two or more modules per processor system 81,91 can be integrated without departing from the scope of this invention.

The expression "for" in for example "for sending", "for receiving" and "for inserting" etc. does not exclude that other functions are performed as well, simultaneously or not. The expressions "P coupled to Q" and "a coupling between P and Q" and "coupling/couples P and Q" etc. do not exclude that an element R is in between P and Q. The expressions "S comprises T" and "S comprising T" etc. do not exclude that an element U is comprised/included as well. The terms "a" and "an" do not exclude the possible presence of one or more pluralities.

The invention claimed is:

1. An access multiplexer for use in a system for transmitting information from a terminal system via the access multiplexer to a network coupled to the access multiplexer, which access multiplexer comprises a virtual forwarder system, wherein the access multiplexer further comprises:
   a sender for sending~ to the terminal system, a virtual forwarder internet protocol address defining at least a part of the virtual forwarder system and
   a receiving means for receiving~ from the terminal system, the information~ to be transmitted to the network wherein the virtual forwarder internet protocol address is in a destination field of an internet protocol header of the information and a destination internet protocol address is in the internet protocol header, the destination internet protocol address defining a destination in the network coupled to said access multiplexer.

2. A system for transmitting information from a terminal system via an access multiplexer to a network coupled to the access multiplexer, which access multiplexer comprises an access multiplexer according to claim 1, wherein said terminal system comprises:
   a receiver for receiving the virtual forwarder internet protocol address; and an inserter for inserting the virtual forwarder internet protocol address into a destination field of an internet protocol header for heading the information and for inserting a destination internet protocol address into a routing field of the internet protocol header, which destination internet protocol address defines a destination in the network.

3. A system as defined in claim 2, wherein the information comprises first application information and second application information, with the destination internet protocol address comprising a first destination internet protocol address defining a first destination in the network and comprising a second destination internet protocol address defining a second destination in the network, and with the internet protocol header comprising a first internet protocol header for heading the first application information and comprising a second internet protocol header for heading the second application information, which first destination internet protocol address is to be inserted into the first internet protocol header and which second destination internet protocol address is to be inserted into the second internet protocol header.

4. A system as defined in claim 3, wherein the first destination comprises a first edge router and in that the second destination comprises a second edge router, with the virtual forwarder internet protocol address being inserted into the destination field of the first internet protocol header and into the destination field of the second internet protocol header.

5. A system as defined in claim 4, wherein the information further comprises third application information, which first application information and which third application information are destined for a first service provider and which second application information is destined for a second service provider, with the destination internet protocol address further comprising a third destination internet protocol address defining a third destination in the network, which third destination comprises a third edge router, and with the internet protocol header further comprising a third internet protocol header for heading the third application information, which third destination internet protocol address is to be inserted into the third internet protocol header, and with the virtual forwarder internet protocol address being inserted into the destination field of the third internet protocol header.

6. A system as defined in claim 3, wherein the virtual forwarder system comprises a first virtual forwarder and a second virtual forwarder, with the virtual forwarder internet protocol address comprising a first virtual forwarder internet protocol address defining the first virtual forwarder and comprising a second virtual forwarder internet protocol address defining the second virtual forwarder, which first virtual forwarder internet protocol address is to be inserted into the destination field of the first internet protocol header and which second virtual forwarder internet protocol address is to be inserted into the destination field of the second internet protocol header, and with the first destination comprising a first application at a first service provider and with the second destination comprising a second application at a second service provider.

7. A method for transmitting information from a terminal system to a network in a system according to claim 2, said method comprising the steps of:
   sending, from the access multiplexer to the terminal system, a virtual forwarder internet protocol address defining at least a part of the virtual forwarder system;
   receiving, at the terminal system, the virtual forwarder internet protocol address; and
   inserting, at the terminal system, the virtual forwarder internet protocol address into a destination field of an internet protocol header for heading the information and inserting a destination internet protocol address into a routing field of the internet protocol header, which destination internet protocol address defines a destination in the network.

8. The access multiplexer according to claim 1, wherein the receiving means supplies the information received to the proper part of the virtual forwarding system based on the virtual forwarder internet protocol address in the destination field of the internet protocol header of the information.

9. The access multiplexer according to claim 1, wherein said sending is performed in response to an initialization signal received from the terminal system; and, said access multiplexer further comprises:
   a consulting means for retrieving the virtual forwarder internet protocol address in response to said initialization signal and providing said virtual forwarder internet protocol address to said sender for sending.

10. A terminal system for use in a system for transmitting information from the terminal system via an access multiplexer to a network coupled to the access multiplexer, which access multiplexer comprises a virtual forwarder system, wherein the terminal system comprises
   a receiver for receiving, from said access multiplexer, a virtual forwarder internet protocol address defining at least a part of the virtual forwarder system; and
   an inserter for inserting the virtual forwarder internet protocol address into a destination field of an internet protocol header for heading the information and for inserting a destination internet protocol address into a routing field of the internet protocol header, which destination internet protocol address defines a destination in the network coupled to said access multiplexer.

* * * * *